United States Patent Office 3,096,385
Patented July 2, 1963

3,096,385
PROCESS FOR PREPARING α-MONOOLEFINIC HYDROCARBONS
Richard L. McConnell and Harry W. Coover, Jr., Kingsport, Tenn., assignors to Eastman Kodak Company, Rochester, N.Y., a corporation of New Jersey
No Drawing. Filed June 30, 1960, Ser. No. 39,822
5 Claims. (Cl. 260—683.15)

This invention relates to a new and improved telomerization process. In a specific aspect this invention relates to a novel process for telomerizing low molecular weight α-monoolefinic hydrocarbons to form higher molecular weight α-monoolefinic hydrocarbons. In another aspect this invention relates to a novel process for the telomerization of ethylene to form higher molecular weight straight chain α-monoolefinic hydrocarbons that are substantially liquid products.

Straight chain monoolefinic hydrocarbons, and particularly those having the double bond on a terminal carbon atom are extremely useful in many chemical processes. For example, in an oxo process where an olefinic hydrocarbon is reacted with carbon monoxide and hydrogen, it is frequenly desirable to employ a 1-olefin as a starting material in order to obtain a hydroformylation product having the —CHO group in the desired position in the carbon chain. Similarly, there are other known reactions where the location of the unsaturated bond in the carbon chain is of considerable significance for the formation of the desired product.

There are various procedures known in the art for the polymerization of ethylene and similar hydrocarbons to form higher molecular weight products. However, in these processes it has been recognized that the location of the unsaturated bond in the carbon chain is usually in a position other than on a terminal carbon atom, and it is also recognized that the product that results contains substantial chain branching instead of having a straight carbon chain.

This invention is concerned with, and has for an object the provision of a novel process for telomerizing low molecular weight α-monoolefins to form higher molecular weight monoolefins. Another object of this invention is to provide a process for the telomerization of ethylene to form higher molecular weight straight-chain α-monoolefinic hydrocarbons. A further object of this invention is to provide a novel catalyst for the telomerization of ethylene to higher molecular weight straight chain α-monoolefins and to obtain results that could not have been predicted from the prior art. Other objects of this invention will be apparent from the detailed description and claims that follow.

These and other objects are attained by means of the process embodying the present invention wherein α-monoolefins, either singly or in admixture, are readily telomerized to higher molecular weight products by effecting the telomerization in the presence of an alkyl aluminum sesquihalide as a catalyst for the process. The alkyl aluminum sesquihalide alone is an effective catalyst for the process. However, in those reactions where a higher yield of 1-olefins is desired the alkyl aluminum halide can be in a complex with a co-catalyst which by itself is not an effective catalyst for the reaction. Throughout the specification and claims the term alkyl aluminum sesquihalide is intended to include those alone or those compounds in a complex with a co-catalyst that tends to increase the percentage of 1-olefins in the product and that does not increase the yield of solid product. The inventive process is carried out in liquid phase in an inert organic liquid and preferably an inert liquid hydrocarbon vehicle, but the process can be carried out in the absence of a diluent. The process proceeds with excellent results over a temperature range of from 80° C. to 250° C. although it is preferred to operate within the range of from about 100° C. to about 225° C. Likewise, the reaction pressures may be varied widely from about atmospheric pressure to very high pressures of the order of 20,000 p.s.i. or higher. In many instances pressures not in excess of 7500 p.s.i. are used. The liquid vehicle employed is desirably one which serves as an inert liquid reaction medium.

The invention is of particular importance in the preparation of straight chain monoolefinic hydrocarbons and particularly straight chain α-monoolefinic hydrocarbons that are substantially liquid products. In the reaction, olefinic hydrocarbons, such as ethylene, propylene, and butenes as well as other α-monoolefins containing up to 10 carbon atoms are used. When ethylene is used, the product of the process contains a high percentage of straight chain α-monoolefins, but it will be understood that other monoolefinic hydrocarbons can be produced.

The improved results obtained in accordance with the invention depend upon the particular catalyst employed. Thus, the catalyst is an alkyl aluminum sesquihalide wherein the alkyl radicals contain from 1 to 12 carbon atoms, such as methyl, ethyl, propyl, butyl, pentyl, octyl, dodecyl, and the like, and the halide is a chloride, bromide, or iodide. The alkyl aluminum sesquihalide can be used alone or in a complex with one or more co-catalysts that increase the percentage of α-monoolefins in the product. Among the co-catalysts are the hexaalkyl phosphoric triamides wherein the alkyl radicals contain from 1 to 8 carbon atoms, such as methyl, ethyl, propyl, hexyl and octyl. Acetylenic compounds can also be used as co-catalysts. The acetylenic compounds have the formula $RC\equiv CH$ wherein R is a hydrocarbon radical containing 1 to 12 carbon atoms such as alkyl, aryl and aralkyl. Metals such as nickel, cobalt and platinum can also be used as co-catalysts. The metals can be used as colloidally suspended metal or they may be used in the form of a metal salt, such as the chloride, acetate, sulfate, phosphate, nitrate and the like. Metal complexes, such as cobalt acetylacetonate, platinum acetylacetonate or nickel acetylacetonate, can also be employed. If desired, the catalyst for our process can be dispersed on an inert support such as silica gel, alumina, celite kieselguhr, aluminosilicates, activated carbon, and the like, but it will be understood that the process can be effected without using a catalyst support.

The limiting factor in the temperature of the process appears to be the decomposition temperature of the catalyst. Ordinarily, temperatures from 100° C. to 225° C. are employed, although temperatures as low as 80° C. or as high as 250° C. can be employed if desired. Usually, it is not desirable or economical to effect the polymerization at temperatures below 80° C., and the process can be readily controlled at these temperatures.

The reaction embodying the invention can be carried out batchwise or in a continuous flowing stream process. The continuous processes are preferred for economic reasons, and particularly good results are obtained using continuous processes wherein a reaction mixture of constant composition is continuously and progressively introduced into the reaction zone and the mixture resulting from the reaction is continuously and progressively withdrawn from the reaction zone at an equivalent rate, whereby the relative concentration of the various components in the reaction zone remains substantially unchanged during the process.

In the continuous flowing stream process, the temperature is desirably maintained at a substantially constant value within the preferred range in order to achieve the highest degree of uniformity of product. Since it is desirable to employ a solution of the monomer of relatively high concentration, the process is desirably effected under a pressure of up to 7500 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 5% by weight based on the weight of the vehicle. The concentration of the monomer in the vehicle will vary rather widely depending upon the reaction conditions and will usually range from about 2 to 50% by weight. The process can also be conducted without using a solvent or diluent and with the monomer in liquid form.

In our process the amount of co-catalyst that is used is generally in a molar ratio of co-catalyst to alkyl aluminum sesquihalide not in excess of 1:1. When hexalkyl phosphoric triamide is used the molar ratio is within the range of 0.1 to 1 and when a metal or metal complex is used the molar ratio usually does not exceed 0.01. The polymerization time can be varied as desired and will usually be of the order of from 30 minutes to several hours in batch processes. Contact times of from 1 to 8 hours are commonly employed in autoclave type reactions. When a continuous process is employed, the contact time in the reaction zone can also be regulated as desired, and in some cases it is not necessary to employ reaction or contact times much beyond one-half to one hour since a cyclic system can be employed.

The organic vehicle employed can be an aliphatic alkane or cycloalkane such as pentane, hexane, heptane or cyclohexane, or a hydrogenated aromatic compound such as decahydronaphthalene, or a high molecular weight liquid paraffin or mixture of paraffins which are liquid at the reaction temperature. Aromatic hydrocarbons such as benzene, toluene, xylene, or the like, are not advantageous since they tend to undergo some alkylation during the reaction. The nature of the vehicle is subject to considerable variation, although the vehicle employed should be liquid under the conditions of reaction and relatively inert. The hydrocarbon liquids are desirably employed. Other solvents which can be used include n-octane, isooctane, methyl cyclohexane, and any of the other well-known inert liquid hydrocarbons.

The telomerization ordinarily is accomplished by merely admixing the components of the telomerization mixture, and no additional heat is necessary unless it is desired to effect the reaction at an elevated temperature. When the highly uniform products are desired employing the continuous process wherein the relative proportions of the various components are maintained substantially constant, the temperature is desirably controlled within a relatively narrow range. This is readily accomplished since the solvent vehicle forms a high percentage of the reaction mixture and hence can be heated or cooled to maintain the temperature as desired.

The following examples are illustrative of this invention.

EXAMPLE 1

*Olefins Prepared in the Presence of Triethylaluminum*

A catalyst system consisting of triethylaluminum (0.04 mole), phenylacetylene (0.005 mole), and nickel acetylacetonate (0.0004 mole) was placed in a dry 300-ml. steel autoclave containing 100 ml. of dry benzene while operating in a nitrogen filled dry box. The autoclave was purged with ethylene and then pressured to 500 p.s.i. with ethylene. Then the reaction mixture was heated to 200° C. and the ethylene pressure was maintained at 3500 p.s.i. for 3 hours with rocking. The reaction mixture was cooled to 25° C. and vented through a Dry Ice-acetone trap. About 4 ml. of butene was condensed in this trap. The autoclave was almost full of a dark liquid. The infrared spectrum of this crude product indicated the presence of vinylidene (branched-chain), internal straight-chain, and terminal olefinic unsaturation in that order. The crude sample was further investigated by gas chromatography and this indicated the presence of olefins containing from 4 to about 12 carbon atoms. When the $C_6$ olefins were investigated, the major component was 2-ethyl-1-butene, while the minor components present were cis- and trans-2-hexene, 1-hexene, and cis-3-methyl-2-pentene. The $C_8$ fraction was predominately 2-ethyl-1-hexene with only a small amount of internal unsaturated straight-chain material and 1-octene was not present at all. This illustrates that very little straight-chain material is present in the reaction mixture and indeed only a very small amount of terminally unsaturated straight-chain material is present. Excluding the benzene solvent, the assay of this sample is listed in the following table.

| Olefins | Relative Amount Present | Number of Compounds |
|---|---|---|
| $C_4$ | 1.0 | 2 |
| $C_6$ | 1.3 | 5 |
| $C_8$ | 1.6 | 3 |
| $C_{10}$ | 1.7 | 5 |
| $C_{12}$ | 0.8 | 5 |

The number of compounds present was determined by gas chromatography and the number of components indicated in the minimum number of compounds present since the peak of some compounds may overlap that of others.

EXAMPLE 2

*Straight-Chain Olefins Prepared in the Presence of Ethylaluminum Sesquichloride and Hexamethylphosphoric Triamide*

Ethylene was reacted at 200° C. and 3500 p.s.i. ethylene pressure for a period of 3 hours in a 300-ml. autoclave in the presence of a catalyst system consisting of ethylaluminum sesquichloride (0.02 mole) and hexamethylphosphoric triamide (0.01 mole) using 100 ml. of dry cyclohexane as the solvent. After cooling the autoclave to room temperature it was vented through a Dry Ice-acetone trap but nothing was condensed. The autoclave was about ⅔ full of a clear liquid. The infrared spectrum of this crude product indicated the presence of 1-olefins with only a trace of internal straight-chain olefins. No vinylidene unsaturation was detected. Gas chromatographic analysis of this mixture indicated the products to be olefins containing up to 12 carbon atoms. The reaction mixture was separated by gas chromatography and the individual fractions were collected for mass spectra determinations. The individual olefin products were identified as 1-butene, 1-hexene, 1-ocetene, 1-decene, and 1-dodecene. This reaction was repeated except that the hexamethylphosphoric triamide concentration was reduced to 0.005 mole. Again the infrared spectrum indicated only straight-chain products.

EXAMPLE 3

*Straight-Chain Olefins Prepared in the Presence of Ethylaluminum Sesquichloride*

Ethylene was reacted in the presence of ethylaluminum sesquichloride (0.02 mole) in 100 ml. of dry heptane under the conditions described in Example 2. After cooling the reaction mixture to room temperature, the autoclave was vented through a Dry Ice-acetone trap and 25 ml. of butene containing a trace of hexene was collected. The autoclave was about ⅔ full of a colorless liquid and an infrared spectrum of this material indicated about equal concentrations of terminal unsaturation and internal straight-chain unsaturation. No vinylidene unsaturation was indicated. This reaction was repeated using ethylaluminum sesquibromide in cyclohexane and similar results were obtained.

EXAMPLE 4

*Straight-Chain Olefins Prepared in the Presence of Ethylaluminum Sesquichloride, Hexamethylphosphoric Triamide, Phenylacetylene, and Nickel Acetylacetonate*

The experiment described in Example 2 was repeated except phenylacetylene (0.005 mole) and nickel acetylacetonate (0.0004 mole) were added in addition to the ethylaluminum sesquichloride and hexamethylphosphoric triamide. When the autoclave was vented, some butene was released. The autoclave was about 2/3 full of an amber colored liquid. The infrared spectrum of this material indicated the presence of terminal olefins and internal straight-chain olefins but no vinylidene unsaturation was present. Analyses of the reaction mixture by gas chromatography and mass spectrometry indicated the major component to be butene with smaller amounts of hexene and octene. The octene fraction was identified as 1-octene.

EXAMPLE 5

*Straight-Chain Olefins Prepared in the Presence of Ethylaluminum Sesquichloride, Hexamethylphosphoric Triamide and Nickel*

The experiment described in Example 2 was repeated except nickel acetylacetonate (0.0004 mole) was used in addition to the ethylaluminum sesquichloride and hexamethylphosphoric triamide. When the autoclave was vented through a Dry Ice-acetone trap, about 4 ml. of butene was condensed. The autoclave was about 2/3 full of a colorless liquid. The infrared spectrum of this material indicated terminal unsaturation and internal straight-chain olefins but no vinylidene unsaturation was detected.

EXAMPLE 6

*Straight-Chain Olefins Prepared in the Presence of Ethylaluminum Sesquichloride, Hexamethylphosphoric Triamide, Phenylacetylene, and Nickel*

Ethylene was reacted using the catalyst system of Example 4 at 150° C. instead of 200° C. The products were similar to those obtained in Example 4.

EXAMPLE 7

*Straight-Chain Olefins Prepared in the Presence of Ethylaluminum Sesquichloride, Hexamethylphosphoric Triamide, Phenylacetylene, and Nickel*

The reaction described in Example 4 was repeated except that the reaction was conducted at 7000 p.s.i. rather than at 3500 p.s.i. ethylene pressure. In this case some solid polyethylene was obtained in addition to liquid olefins.

EXAMPLE 8

*Straight-Chain Olefins Prepared in the Presence of Ethylaluminum Sesquichloride, Hexamethylphosphoric Triamide, Phenylacetylene, and Nickel*

The reaction described in Example 4 was repeated except the ethylene pressure was maintained at 1000 p.s.i. instead of 3500 p.s.i. In this case the products were similar to those obtained in Example 4.

EXAMPLE 9

The reaction described in Example 4 was repeated using propylene as the monomer and 1-butene as the monomer and the products contained substantial amounts of 1-olefins.

EXAMPLE 10

The reaction described in Example 4 was repeated using n-butyl aluminum sesquichloride, hexyl aluminum sesquibromide and propyl aluminum sesquiiodide instead of ethyl aluminum sesquichloride, and hexapropyl phosphoric triamide and hexabutyl phosphoric triamide in place of hexamethyl phosphoric triamide to produce products containing substantial amounts of 1-olefins.

Although the invention has been described in considerable detail with reference to certain preferred embodiments thereof, variations and modifications can be effected within the spirit and scope of the invention as described hereinabove and as defined in the appended claims.

We claim:

1. The method which comprises forming monoolefinic hydrocarbons by contacting an α-monoolefinic hydrocarbon containing up to 10 carbon atoms with a catalyst consisting essentially of an alkyl aluminum sesquihalide wherein the alkyl radical contains from 1 to 12 carbon atoms and the halogen is selected from the group consisting of chlorine, bromine and iodine and a hexaalkyl phosphoric triamide.

2. The method which comprises forming straight chain α-monoolefinic hydrocarbons by contacting ethylene with a catalyst consisting of an alkyl aluminum sesquihalide wherein the alkyl radical contains from 1 to 12 carbon atoms and the halogen is selected from the group consisting of chlorine, bromine and iodine and a hexaalkyl phosphoric triamide.

3. The method which comprises forming straight chain α-monoolefinic liquid hydrocarbons by contacting ethylene with a catalyst consisting of ethyl aluminum sesquichloride and hexamethyl phosphoric triamide.

4. As a composition of matter, a catalyst for forming straight-chain liquid α-monoolefins from ethylene consisting essentially of an alkyl aluminum sesquihalide wherein the alkyl radical contains from 1 to 12 carbon atoms and the halogen is selected from the group consisting of chlorine, bromine and iodine and a hexaalkyl phosphoric triamide wherein the alkyl radicals contain from 1 to 8 carbon atoms.

5. As a composition of matter, a catalyst for forming straight-chain liquid monoolefins from ethylene consisting essentially of ethyl aluminum sesquichloride and hexamethyl phosphoric triamide.

References Cited in the file of this patent

UNITED STATES PATENTS

| | | |
|---|---|---|
| 2,781,410 | Ziegler et al. | Feb. 12, 1957 |
| 2,924,579 | Young | Feb. 9, 1960 |
| 2,956,991 | Coover et al. | Oct. 18, 1960 |
| 2,969,408 | Nowlin et al. | Jan. 24, 1961 |

OTHER REFERENCES

Schildknecht: "Vinyl and Related Polymers" published by John Wiley & Sons, Inc., New York, 1952 (pages 504–5 relied on.)